US010554142B2

(12) United States Patent
Vasiladiotis et al.

(10) Patent No.: US 10,554,142 B2
(45) Date of Patent: Feb. 4, 2020

(54) MODULATION OF AC/AC MMC

(71) Applicant: ABB SCHWEIZ AG, Baden (CH)

(72) Inventors: Michail Vasiladiotis, Zürich (CH);
Tobias Geyer, Ennetbaden (CH);
Alexandre Christe, Veysonnaz (CH)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 16/326,038

(22) PCT Filed: Aug. 18, 2016

(86) PCT No.: PCT/EP2016/069657
§ 371 (c)(1),
(2) Date: Feb. 15, 2019

(87) PCT Pub. No.: WO2018/033214
PCT Pub. Date: Feb. 22, 2018

(65) Prior Publication Data
US 2019/0199230 A1    Jun. 27, 2019

(51) Int. Cl.
*H02M 5/22* (2006.01)
*H02M 5/297* (2006.01)
*H02M 1/08* (2006.01)
*H02J 3/01* (2006.01)
*H02M 1/12* (2006.01)
*H02J 3/34* (2006.01)

(52) U.S. Cl.
CPC ........... *H02M 5/225* (2013.01); *H02M 5/297* (2013.01); *H02J 3/01* (2013.01); *H02J 3/34* (2013.01); *H02M 1/08* (2013.01); *H02M 1/12* (2013.01)

(58) Field of Classification Search
CPC ....... H02M 5/225; H02M 5/293; H02M 5/297; H02M 1/12; H02M 1/08; H02M 2001/0006; H02M 2007/4835; H02J 3/34; H02J 3/01
See application file for complete search history.

(56) References Cited

U.S. PATENT DOCUMENTS 10,074,978 B2 * 9/2018 Geyer ............... H02M 7/53873

OTHER PUBLICATIONS

International Search Report, issued in PCT/EP2016/069657, dated May 18, 2017.
International Preliminary Report on Patentability, issued in PCT/EP2016/069657, dated Jul. 16, 2018.
(Continued)

*Primary Examiner* — Kyle J Moody
(74) *Attorney, Agent, or Firm* — Birch, Stewart, Kolasch & Birch, LLP (57) ABSTRACT

A method of decoupled modulation of a direct AC/AC MMC between a first AC network L having a first waveform and a second AC network R having a second waveform includes performing first and second modulations based on respective reference signals of the first and second AC networks to generate, for each phase leg, first and second integer command signals corresponding to first and second combinations of cell states in the branches of the phase leg needed for generating the first and second waveforms. The method also includes, based on the first and second integer command signals, mapping to each branch a number of cell states to be used for concurrently generating both the first and second waveforms.

20 Claims, 3 Drawing Sheets

(56) References Cited

OTHER PUBLICATIONS

Liu et al., "Simplified model and submodule capacitor voltage balancing of single-phase AC/AC modular multilevel converter for railway traction purpose", IET Power Electronics, 2016, vol. 9, Iss. 5, pp. 951-959.

Thitichaiworakorn et al., "A Medium-Voltage Large Wind Turbine Generation System Using an AC/AC Modular Multilevel Cascade Converter", IEEE Journal of Emerging and Selected Topics in Power Electronics, Jun. 2016, vol. 04, No. 2, pp. 534-546.

Vasiladiolis et al., "Accurate Capacitor Voltage Ripple Estimation and Current Control Considerations for Grid-Connected Modular Multilevel Converters", IEEE Transactions on Power Electronics, Sep. 2014, vol. 29, No. 9, pp. 4568-4579.

Vasiladiotis et al., "Single-to-Three-Phase Direct AC/AC Modular Multilevel Converters with Integrated Split Battery Energy Storage for Railway Interties", 2015 17th European Conference on Power Electronics and Applications (EPE'15 ECCE-Europe), Jointly Owned by EPE Association and IEEE PELS, Sep. 8, 2015, pp. 1-7, XP032800179.

Written Opinion of the International Searching Authority, issued in PCT/EP2016/069657, dated May 18, 2017.

\* cited by examiner

MODULATION OF AC/AC MMC

TECHNICAL FIELD

The present disclosure relates to modulation of direct alternating current (AC) to AC Modular Multilevel Converter (MMC).

BACKGROUND

An MMC is a power converter comprising series-connected cells (also known as modules or submodules), forming what is called a converter branch (also known as arm). These branches can be configured in several manners leading to dedicated converter topologies. According to whether this branch needs to provide only positive or also negative voltages, the cell can be implemented by means of a half-bridge or a full-bridge (also called bipolar or H-bridge) cell, respectively. A three-to-single-phase direct AC/AC MMC structure in double-star configuration may be used for interconnection of a three-phase utility grid, e.g., 50 Hz, with e.g. a single-phase railway supply, e.g., at 50/3 (synchronous) or 16.7 Hz (asynchronous).

SUMMARY

The present invention relates especially to a modulation problem of medium voltage direct AC/AC MMC, e.g. three-to-single-phase for railway applications. In this case and when a modulator is used on the level of each converter branch (modulation references, e.g. voltage references and/or flux references, are used for each branch during modulation), an inherent harmonic coupling is observed between the two AC networks (e.g. a three-phase network and a single-phase network) according to their frequency ratio mainly because of the lack of symmetry in the resulted modulation patterns. This effect is more visible when the converter is operated with low cell numbers and low switching frequencies. Moreover, more sophisticated modulators, such as optimized pulse patterns (OPPs), cannot be directly designed and applied on a branch level. For synchronous utility and railway grid operation, one would have to design a pattern featuring two different frequencies, which would be a quite complex procedure. The complexity of the problem becomes unrealistically high in asynchronous network operation, where one would have to additionally account for all possible phase-shifts between the two networks.

A solution to the aforementioned problems is proposed based on a decoupled modulation concept. More specifically, each converter side, e.g. three- and single-phase, are modulated independently. The modulation results are then mapped into branch level command signals using a mapping function and are then fed to a capacitor voltage balancing algorithm, e.g., a sorting and selection algorithm for final determination of each cell switching signal. According to the chosen modulation method for each side, a choice for circulating current control implementation may be also used for more stable system operation.

One of the possible combined control/modulation method is Model Predictive Pulse Pattern Control (MP3C), which is a fast closed-loop controller of OPPs. MP3C is based on the principle of Model Predictive Control (MPC) and uses the so-called Receding Horizon Policy. MP3C allows the use of general OPPs with discontinuities in the switching angles when changing the modulation index.

According to an aspect of the present invention, there is provided a method of decoupled modulation of a direct AC/AC MMC between a first AC network having a first waveform and a second AC network having a second waveform, the MMC having a double-star topology with a plurality of phase legs, each phase leg having a first branch and a second branch, each of the first and second branches comprising a plurality of series connected bipolar cells. The method comprises performing a first modulation based on a reference signal of the first AC network, independently of a reference signal of the second AC network, to generate, for each phase leg, a first integer command signal corresponding to a first combination of cells cell states in the first and second branches of the phase leg needed for generating the first waveform. The method also comprises performing a second modulation based on the reference signal of the second AC network, independently of the reference signal of the first AC network, to generate, for each phase leg, a second integer command signal corresponding to a second combination of cell states in the first and second branches of the phase leg needed for generating the second waveform. The method also comprises, based on the first and second integer command signals, mapping to each branch a number of cell states to be used for concurrently generating both the first and second waveforms, generating branch-level command signals to a capacitor voltage balancing algorithm. The method also comprises, based on the mapping and the balancing algorithm, sending firing signals to the plurality of cells of each branch. The method may e.g. be performed in/by a controller of the MMC.

According to another aspect of the present invention, there is provided a computer program product comprising computer-executable components for causing a controller of an MMC to perform an embodiment of the method of the present disclosure when the computer-executable components are run on processor circuitry comprised in the controller.

According to another aspect of the present invention, there is provided a direct AC/AC MMC configured to be connected between a first AC network having a first waveform and a second AC network having a second waveform, the MMC having a double-star topology with a plurality of phase legs, each phase leg having a first branch and a second branch, each of the first and second branches comprising a plurality of series connected bipolar cells. The MMC further comprises a controller comprising processing circuitry, and storage storing instructions executable by said processor circuitry whereby said controller is operative to perform a first modulation based on a reference signal of the first AC network, independently of a reference signal of the second AC network, to generate, for each phase leg, a first integer command signal corresponding to a first combination of cell states in the first and second branches of the phase leg needed for generating the first waveform. The controller is also operative to perform a second modulation based on the reference signal of the second AC network, independently of the reference signal of the first AC network, to generate, for each phase leg, a second integer command signal corresponding to a second combination of cell states in the first and second branches of the phase leg needed for generating the second waveform. The controller is also operative to, based on the first and second integer command signals, map to each branch a number of cell states to be used for concurrently generating both the first and second waveforms, generating branch-level command signals to a capacitor voltage balancing algorithm. The controller is also operative to, based on the mapping and the balancing algorithm, send firing signals to the plurality of cells of each branch.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
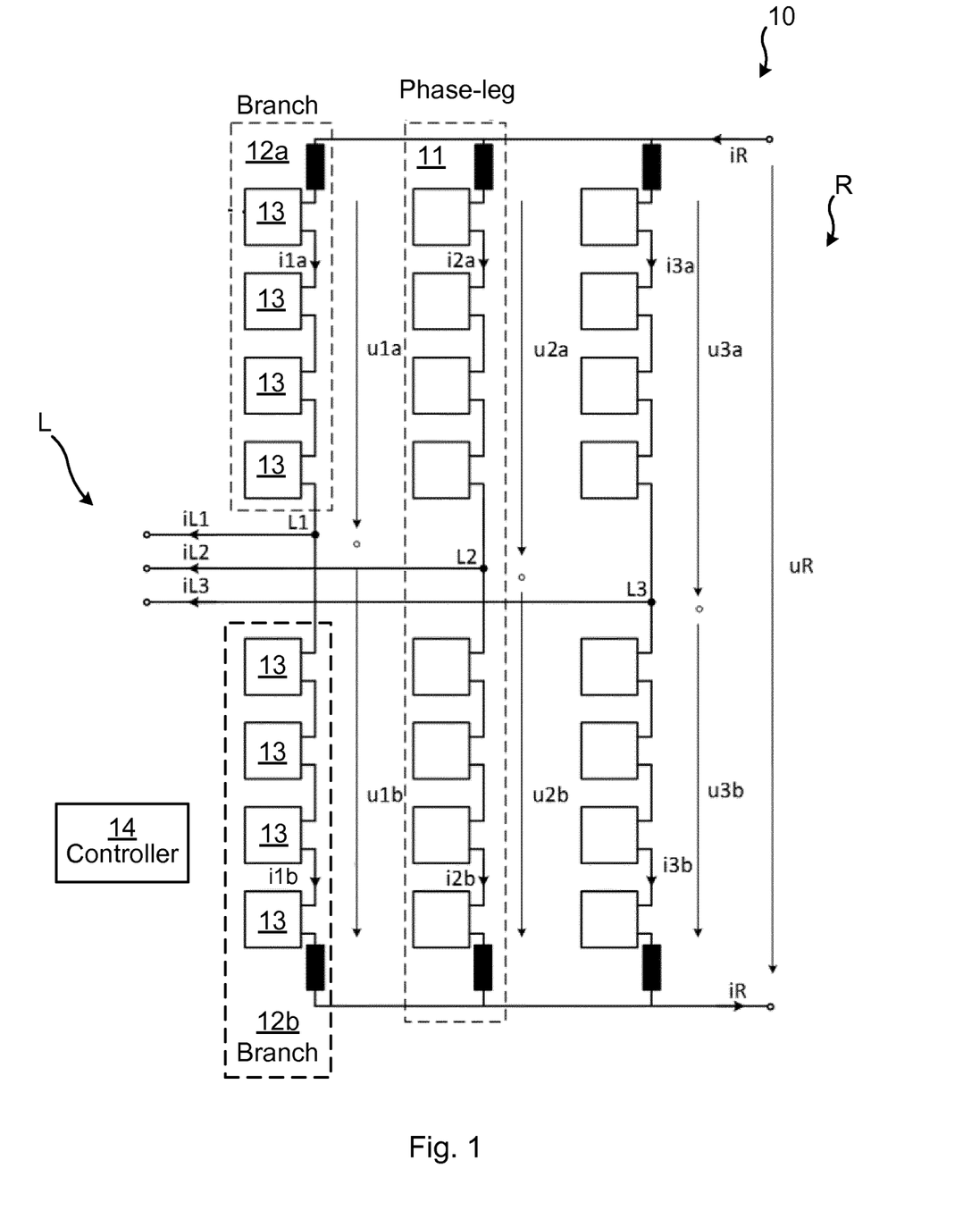
FIG. 1 is a schematic circuit diagram of an embodiment of a three-phase-to-single-phase AC/AC MMC in accordance with the present invention.

FIG. 1 is a schematic illustration of an MMC 1 in direct double-star configuration between a first AC network L, which is a three-phase network having currents iL1, iL2 and iL3, and the, and a second AC network R, which is a single-phase network having the current iR and the voltage uR. The first AC network may e.g. be a national power distribution network which may have a utility frequency (power line/mains frequency) of for instance 50 or 60 Hz. The second AC network R may e.g. be for a railway electrification system, and may have a utility frequency of for instance 25 Hz, 50/3 Hz (synchronous) or 16.70 Hz (asynchronous).

The MMC 1 comprises a plurality of phase legs 11, here three (one per phase of the first AC network L), where each phase leg comprises a first (upper) branch (arm) 12a and a second (lower) branch 12b. Each branch 12 comprises a plurality of series connected converter cells 13. In the figure, the currents and voltages relating to the first branches 12a are indexed "a" while the currents and voltages relating to the second branches 12b are indexed "b".

Typically, each branch 12 comprises the same number of cells 13. Embodiments of the present invention may be particularly useful for a relatively small number of cells per branch, why the number of series connected cells in each branch may be less than 20, e.g. less than 15 or less than 10.

The MMC 1 also comprises a controller 14 which is schematically shown in FIG. 1. The controller may be a control system comprising a central unit and/or distributed units associated with respective legs 11 or branches 12. The controller 14 may be configured, e.g. by means of computer programming, to perform embodiments of the method of the present disclosure.

The MMC 1 may be a medium voltage converter, e.g. having a voltage rating of less than 30 kV (thus being configured for an operating voltage of less than 30 kV) and/or a power rating within the range of 10 to 60 MW, e.g. 15 to 30 MW (thus being configured for an operating power within the range of 10 to 60 MW, e.g. 15 to 30 MW).

Figure 2:
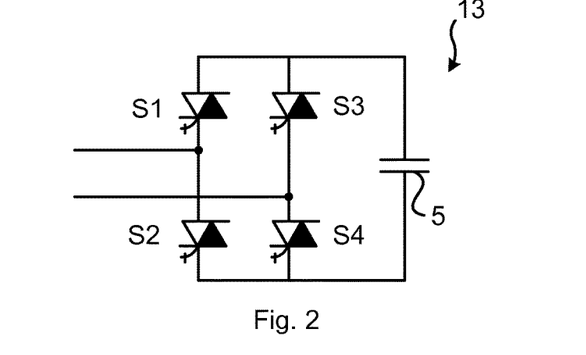
FIG. 2 is a schematic circuit diagram of an embodiment of a bipolar cell of an MMC, in accordance with the present invention.

FIG. 2 illustrates an example of a bipolar cell 13. The cell comprises an energy storing device 5, here in the form of a capacitor. The energy storing device 5 may comprise a capacitor arrangement with any number of capacitors in series and/or parallel connection with each other. The cell 13 also comprises four semiconductor switches S, forming the full-bridge (H-bridge) topology in the cell. Any number of semiconductor switches may be used as long as the cell is still bipolar, and the cell with four switches shown in the figure is only an example. The semiconductor switches of the bipolar cell are conventionally named in the figure as S1 switch, S2 switch, S3 switch and S4 switch. When the switches S1 and S4 are closed and S2 and S3 are open, the cell is in a +1 state in which a positive voltage will be applied. By opening S1 and S4 switches and closing S2 and S3 switches, this voltage is reversed whereby the cell is in a −1 state and a negative voltage will be applied. Each of the S switches may comprise e.g. an insulated-gate bipolar transistor (IGBT) or a gate commutated thyristor GCT (in which case a snubber circuit may also be needed), for instance an integrated gate commutated thyristor (IGCT), a reverse-conducting IGCT (RC-IGCT) or a bi-mode GCT (BGCT), possibly in combination with an antiparallel one-direction conducting/blocking component such as a diode. In the example of FIG. 2, each S switch comprises an IGCT and antiparallel diode.

Embodiments of the present invention may be especially advantageous for cells 13 having a relatively low switching frequency, e.g. of at most 150 Hz, e.g. at most 100 Hz or 50 Hz.

Embodiments of the present invention relates to the modulation problem of medium voltage three-to-single-phase direct AC/AC MMC, e.g. for railway applications.

When a modulator is used on the level of each converter branch in accordance with prior art, a harmonic coupling is observed between the two networks L and R according to their frequency ratio. This effect is more visible when the converter is operated with low cell numbers and low switching frequencies. Moreover, more sophisticated modulators, such as optimized pulse patterns (OPPs), cannot be directly designed and applied on a branch level. For synchronous utility or railway grid operation, one would have to design a pattern featuring two different frequencies, which would be a quite complex procedure. The complexity of the problem becomes unrealistically high in asynchronous network operation, where one would have to additionally account for all possible phase-shifts between the two networks.

A solution to the aforementioned problems is herein proposed based on a decoupled modulation concept instead. More specifically, each converter side, i.e., three- and single-phase sides of the first and second networks, respectively, are modulated independently. The modulation results are then mapped into branch level command signals using a mapping function and are then fed to a capacitor voltage balancing algorithm, e.g. a sorting and selection algorithm, for final determination of each cell switching signal (firing signals). According to the chosen modulation method for each side, a choice for circulating current control implementation may also be used.

The per branch 12 modulation methods are quite attractive due to the fact that they can be implemented in a distributed manner together with the cell capacitor voltage balancing algorithm. In the direct AC/AC MMC 1, this means that both modulation references resulting from the respective sides of the first and second networks L and R are fed into the same modulator. In case of a voltage signal-based modulation scheme, the global modulation references for the upper and lower branches 12a and 12b of the same phase-leg 11 have to be therefore calculated as $$u_{ka}^*(t) = \frac{u_R^*(t)}{2} - u_{Lk}^*(t) - u_{cm}^*(t) - u_{circk}^*(t) \quad (1)$$

$$u_{kb}^*(t) = \frac{u_R(t)}{2} + u_{Lk}^*(t) + u_{cm}^*(t) - u_{circk}^*(t) \quad (2)$$

where k=1, 2, 3 correspond to the three different phases, $u_R^*(t)$, $u_{Lk}^*(t)$ denote the result of the first L and second R network side application control, respectively, $u_{cm}^*(t)$ is a freely chosen common-mode voltage component and $u_{circk}^*(t)$ is the result of the MMC inner control (branch capacitor voltage unbalance mitigation and circulating current injection).

However, such an implementation simplicity comes at the cost of a harmonic interaction between the two networks L and R, especially at low cell numbers and switching frequencies. In order to demonstrate this effect, an ideal modulation per branch with three-phase frequency $f_3$=50 Hz and single-phase frequency $f_1$=50/3 or 16 Hz was simulated without considering any ripples on the capacitor voltages. The harmonics were analysed using the IEC 61000-4-7 standard regarding harmonics and interharmonics. The Digital Fourier Transform (DFT) was performed over a number of ten fundamental periods for each side.

Such a modulation per branch does not guarantee quarter-wave symmetry in the switching pattern at each side, which has an effect on the harmonic spectrum. Therefore it can be said that according to the frequency ratio between the two grid frequencies $f_3$ and $f_1$, a different harmonic coupling may be observed. The results can be summarized as follows, with $\{k,n\} \in N, \{k,n\} > 1$:

- $kf_1 = f_3$: inter-harmonics appear on the three-phase side;
- $f_1 = nf_3$: even harmonics appear on the single-phase side and no common-mode harmonic cancellation occurs on the three-phase side;
- $f_1 = f_3$: no inter-harmonics on either side but no common-mode harmonic cancellation occurs on the three-phase side (two frequencies coincide);
- $kf_1 = nf_3$: inter-harmonics appear on both sides.

More sophisticated modulators, such as OPPs, cannot practically be applied using such an approach per branch 12.

Figure 3:
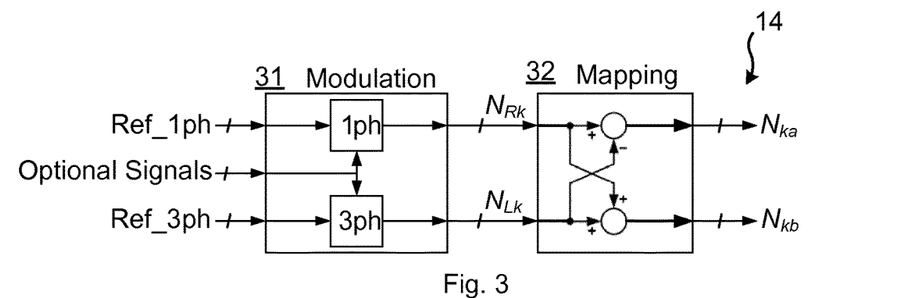
FIG. 3 is a schematic functional diagram of an embodiment of modulation and mapping performed in a controller of an MMC, in accordance with the present invention.

A generalized and simplified block diagram of the proposed modulation concept is illustrated in FIG. 3. Each network side (three-phase, 3 ph, of the side of the first network L and single-phase, 1 ph, of the side of the second network R) is modulated 31 independently, having received an appropriate reference signal from the upper-layer application controllers, here denoted in a general manner as Ref_1ph and Ref_3ph, respectively. These could be time-varying voltage or virtual flux signals, modulation indexes with respective angle etc. They could also have different dimensions according to the chosen method. The modulation results are integer side-level command signals $N_{Rk}$ for the second network R and $N_{Lk}$ for the first network L, for each phase leg 11 (k=first, second, third phase). These side-level signals are mapped 32 to branch-level command signals, which may be within the range of −N to +N where N is the number of cells 13 in each branch 12, in order to be fed to the capacitor voltage balancing algorithm. A branch-level command signal of +N indicates that all cells in the branch should have the state +1, while −N indicates that all cells in the branch should have the state −1 (lower absolute values indicate that one or several cells in the branch should be bypassed and thus have the state 0). These branch signals are here denoted $N_{ka}$ for the first branch 12a and $N_{kb}$ for the second branch 12b. The modulation signals may be updated at least with the same frequency as the branch equivalent switching frequency (i.e. cell output-level equivalent switching frequency times the number of cells 13 in each branch 12). By means of the mapping 32 it is determined which combination of cell states, +1, −1 or 0 (bypassed) each of the branches 12 needs to be at the same time achieve the first and second waveforms of the first and second AC networks L and R, respectively, as previously independently modulated 31. The mapping allows the modulation 31 to be performed on a side level, rather than on a branch level, in accordance with the present invention. Generally, the first waveform (of the three-phase first network L) is achieved for the MMC topology of FIG. 1, for each phase leg 11, as half of the difference in combined cell states between the first and second branches 12a and 12b of that phase leg. The second waveform (of the single-phase second network R) is at the same time achieved as the sum of the combined cell states of the first and second branches 12a and 12b of the respective phase leg 11.

Such decoupled modulation was also simulated and it was shown that the decoupled modulation concept leads to quarter-wave symmetry on both sides. As a result, the voltage spectrum of both sides is free of any interharmonics. Moreover, common-mode harmonics cancel out on the level of the three-phase line voltage. Furthermore, the decoupled modulation is insensitive to asynchronous operation or the different possible phase-shifts between the three-phase and single-phase grids L and R.

A further improvement regarding modulation towards the single-phase converter side may be achieved by means of interleaving between the three individual converter phase legs 11, i.e. by switching in each of the legs 11 in sequence rather than simultaneously. The increased voltage resolution on the single-phase side leads to a lower single-phase harmonic spectrum. It is noted that depending on the chosen interleaving method, the signals $N_{Rk}$ of dimension k might be substituted by the signals $N_{Rka}$ and $N_{Rkb}$ referring to the first and second (12a) and (12b) branches of the phase k. In this case and without loss of generality, the mapping function would instead be $$N_{ka}=N_{Rka}-N_{Lk} \quad (3)$$

$$N_{kb}=N_{Rkb}+N_{Lk} \quad (4)$$

Three different methods for single-phase side interleaving are possible:

(a) Phase-leg interleaving: This implies that the three phase-legs 11 are switched asynchronously, so as to create a larger number of voltage steps towards the single-phase side of the second network R. This leads to a maximum of 3(2N)+1 voltage levels in the single-phase (second) waveform.

(b) Common-mode voltage shift interleaving: This implies switching all upper 12a and all lower 12b branches simultaneously. This method leads to a maximum of 2(2N)+1 levels towards the single-phase side. This will lead to a common-mode voltage on the three-phase side of the first network L. The latter may be distributed to the converter 1 in a manner so that its zero average value can be guaranteed.

(c) Combined interleaving: This refers to the combination of methods (a) and (b), i.e., the interleaving between the upper and lower branches of the three phase-legs as well as interleaving between the three phase-legs. This would lead to a maximum of 6(2N)+1 levels towards the single-phase side.

It is noted that according to the chosen modulation method, special control and logic functions might have to be implemented in order to ensure uniform switching frequency among all branches as well as zero average common-mode voltage.

Embodiments of the present invention may be conveniently implemented, e.g. in the controller 14, using one or more conventional general purpose or specialized digital computer, computing device, machine, or microprocessor, including one or more processors or other processing circuitry e.g. field-programmable gate array (FPGA), memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The decoupled modulation in accordance with the present invention works well under ideal conditions, i.e., when considering zero cell capacitor voltage ripples. In reality, there may still be some coupling because of the existence of capacitor voltage ripples. However, this coupling may be identified and compensated for by choosing a suitable modulation method for each side.

Example 1

Figure 4:
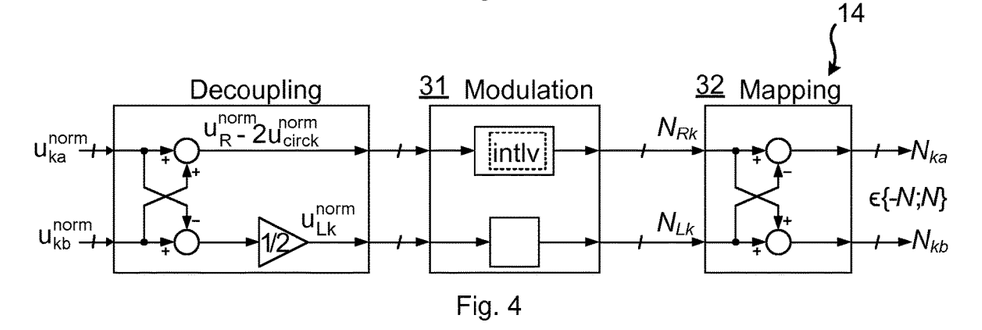
FIG. 4 is a schematic functional diagram of another embodiment of modulation and mapping performed in a controller of an MMC, in accordance with the present invention.

FIG. 4 illustrate a more specific example than the general illustration in FIG. 3, by using well-known modulation methods nearest level modulation (NLM) or carrier-based pulse width modulation (CB-PWM). When such a well-known modulation method is used, it is noted that in order to account for the significant capacitor voltage variations in the modulation process, the modulation references are usually normalized with the measured branch capacitor voltage sums, leading therefore to $$u_{ka}^{norm}(t)=u_{ka}^*(t)/\Sigma u_{ka}^{cell}(t) \quad (5)$$

$$u_{kb}^{norm}(t)=u_{kb}^*(t)/\Sigma u_{kb}^{cell}(t) \quad (6)$$

In order to implement a decoupled modulation scheme for this case without losing the information for the circulating current-driving voltage $u_{circk}^*$ or the branch capacitor voltage sums, the respective control diagram may have to be modified as shown in FIG. 4.

It is noted that the circulating current control is performed by having three individual references for the single-phase side, i.e., per converter phase leg 11. Moreover, additional logic may be implemented for the single-phase side modulation, in order to achieve interleaving towards the side of the second network R. It is also noted that the six branch 12 capacitor voltage sums are not the only option for normalizing the branch modulation references. One could choose any normalization factor according to a desired performance.

Example 2

Figure 5:
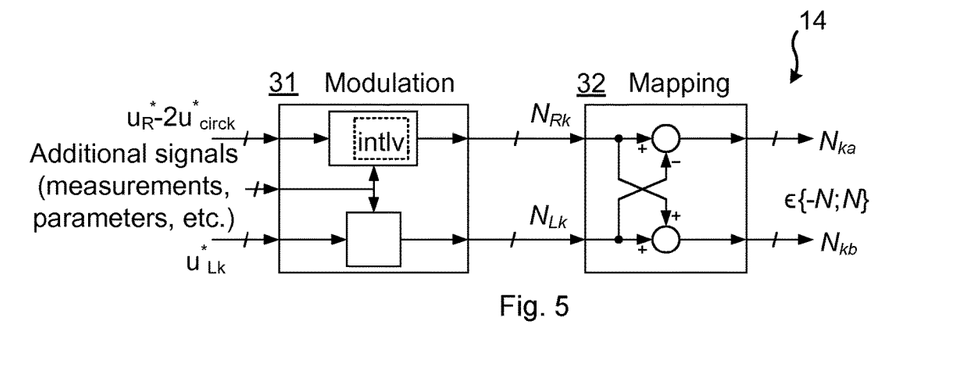
FIG. 5 is a schematic functional diagram of another embodiment of modulation and mapping performed in a controller of an MMC, in accordance with the present invention.

In this example, a more advanced modulator scheme is used. As illustrated in FIG. 5, there is no need for compensating for the voltage ripples by normalizing with the measured branch capacitor voltage sums, since the latter is performed on the level of the modulation algorithm instead.

Therefore, the diagram may be redrawn as shown in FIG. 5. It is noted that in such a case, additional feedback signals are needed on the level of the modulation algorithms. These include measurements, e.g., branch currents, as well as parameters, e.g., value of the cell capacitance.

Example 3

Figure 6:
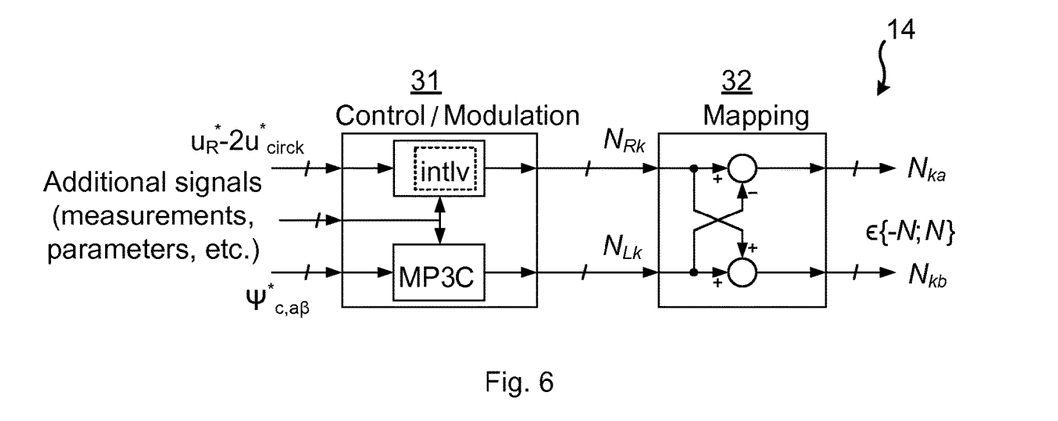
FIG. 6 is a schematic functional diagram of another embodiment of modulation and mapping performed in a controller of an MMC, in accordance with the present invention.

In this example, illustrated in FIG. 6, closed-loop controlled OPPs are used, e.g. MP3C. In the lower power range of the example case of railway applications, only a few number of cells may be used. In addition, the single-phase voltage of the second network R is given by the catenary, therefore the three-phase voltage side of the first network L is usually scaled according to the nominal semiconductor current. This could lead to the under-utilization of the number of voltage levels towards the three-phase side.

The use of OPPs implies an active shaping of the harmonic spectrum. In such a case, the concept of decoupled modulation offers the capability of treating the two converter sides independently and therefore not having to design and apply the OPP directly on a branch level. The latter would have been nearly impossible to achieve given the existence of two system frequencies but also an infinite number of phase-shifts between the two networks L and R in the asynchronous grid operation case.

However, OPPs cannot be easily combined with a closed-loop control system for several reasons. First, the discontinuity of the switching angles when varying the modulation index prevents the use of linear controllers due to stability issues. Second, unlike modulation methods with a fixed modulation cycle such as CB-PWM and space vector modulation (SVM), OPPs are associated with a non-zero ripple current at the end of the switching period. The bandwidth of a conventional current controller thus has to be slow, limiting the capability of the controller to reject disturbances and to react to transients. Last but not least, OPPs are typically calculated considering 'ideal' conditions, i.e., neglecting system disturbances. This limits the applicability of OPPs to MMC 1 configurations without additional necessary control actions, due to the considerable inherent capacitor voltage ripples and other system non-idealities.

Due to above stated reasons, an advanced closed-loop control and modulation method, such as Model Predictive Pulse Pattern Control (MP3C), may be utilized in conjunction with the offline precomputed OPPs. MP3C controls the (virtual) flux vector along a (virtual) flux reference trajectory. The latter is obtained by integrating up the nominal switched voltage waveform of the OPP. The difference between the (measured or estimated) flux vector and its reference is the flux error. By modifying the switching instants of the OPP over a prediction horizon, the flux error may be minimized and closed-loop control of the (virtual) flux and thus of the currents may be achieved.

Only the first part of the modified OPP within the time interval $[t, t+T_s]$, where $T_s$ is the sampling interval, is applied to the converter 1. At the next sampling instant, using new measurements (or estimates), the flux error minimization is repeated over a shifted or receding prediction horizon. This so-called receding horizon policy provides feedback and ensures that the controller is robust to parameter uncertainties. The condition on the horizon is to have at least two switching events in two different phases in order to be able to drive the flux error to zero.

Originally, the concept of MP3C has been developed for three-phase systems. As a straightforward solution, the MP3C concept is utilized only on the three-phase side of the first network L. The single-phase side of the second network R may therefore be modulated simply using e.g. PSC-PWM, leaving the possibility of performing circulating current control from the single-phase side. This is depicted in the simplified block diagram of FIG. 6. It is noted that since MP3C is a three-phase control model, the converter flux reference in stationary reference frame $\psi_{c,\alpha\beta}^*$ has to be provided to the controller 14. The latter is based on the chosen OPP for the specific operating point.

Alternatively, OPPs may be also designed and used for the single-phase side of the second network R as well. To this end, the MP3C concept may be modified to the single-phase side, by considering only one phase and tracking the flux reference in this given phase.

Figure 7:
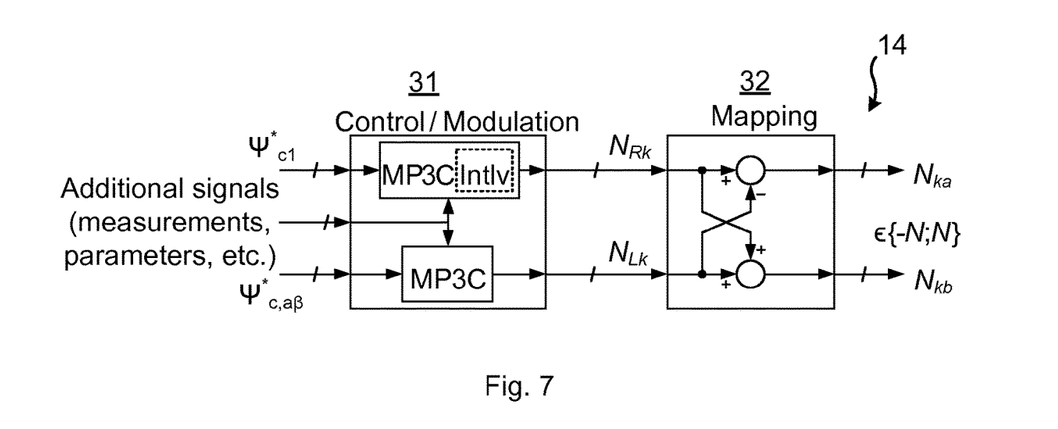
FIG. 7 is a schematic functional diagram of another embodiment of modulation and mapping performed in a controller of an MMC, in accordance with the present invention.

A modified block diagram is shown in FIG. 7. The three-phase side of the first network L is now responsible for controlling the circulating current by employing a dead-beat circulating current controller (DBC3). The single-phase side of the second network R is operating with a scalar MP3C. The interleaving block needs information regarding the state of both sides, therefore it is drawn outside of the single-phase modulation block.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of decoupled modulation of a direct AC/AC modular multilevel converter (MMC) between a first AC network having a first waveform and a second AC network having a second waveform, the MMC having a double-star topology with a plurality of phase legs, each phase leg having a first branch and a second branch, each of the first and second branches comprising a plurality of series connected bipolar cells, the method comprising:
performing a first modulation based on a reference signal of the first AC network, independently of a reference signal of the second AC network, to generate, for each phase leg, a first integer command signal corresponding to a first combination of cell states in the first and second branches of the phase leg needed for generating the first waveform;
performing a second modulation based on the reference signal of the second AC network, independently of the reference signal of the first AC network, to generate, for each phase leg, a second integer command signal corresponding to a second combination of cell states in the first and second branches of the phase leg needed for generating the second waveform;
based on the first and second integer command signals, mapping to each branch a number of cell states to be used for concurrently generating both the first and second waveforms, generating branch-level command signals to a capacitor voltage balancing algorithm; and
based on the mapping and the balancing algorithm, sending firing signals to the plurality of cells of each branch;
wherein the first AC network is a three-phase AC network;
wherein the second AC network is a single-phase AC network.

2. The method of claim 1, wherein the second AC network is a railway electrification network.

3. The method of claim 1, wherein the first AC network has a nominal frequency of 50 Hz or 60 Hz.

4. The method of claim 1, wherein the second AC network has a nominal frequency of 25 Hz, 50/3 Hz or 16.70 Hz.

5. The method of claim 1, wherein the plurality of cells of each branch is less than 20 cells.

6. The method of claim 1, wherein each of the plurality of cells has a switching frequency of at most 150 Hz.

7. The method of claim 1, wherein the MMC has an operating voltage of less than 30 kV.

8. The method of claim 1, wherein the MMC has an operating power within the range of 10 to 60 MW.

9. A computer program product comprising computer-executable components for causing a controller of the MMC to perform the method of claim 1 when the computer-executable components are run on processor circuitry comprised in the controller.

10. A direct AC/AC modular multilevel converter (MMC) configured to be connected between a first AC network being a three-phase AC network and having a first waveform and a second AC network being a single-phase AC network and having a second waveform, the MMC having a double-star topology with a plurality of phase legs, each phase leg having a first branch and a second branch, each of the first and second branches comprising a plurality of series connected bipolar cells, the MMC further comprising a controller comprising:
- processing circuitry; and
- storage storing instructions executable by said processor circuitry whereby said controller is operative to:
  - perform a first modulation based on a reference signal of the first AC network, independently of a reference signal of the second AC network, to generate, for each phase leg, a first integer command signal corresponding to a first combination of cell states in the first and second branches of the phase leg needed for generating the first waveform;
  - perform a second modulation based on the reference signal of the second AC network, independently of the reference signal of the first AC network, to generate, for each phase leg, a second integer command signal corresponding to a second combination of cell states in the first and second branches of the phase leg needed for generating the second waveform;
  - based on the first and second integer command signals, map to each branch a number of cell states to be used for concurrently generating both the first and second waveforms, generating branch-level command signals to a capacitor voltage balancing algorithm; and
  - based on the mapping and the balancing algorithm, send firing signals to the plurality of cells of each branch.

11. The MMC of claim 10, wherein the second AC network is a railway electrification network.

12. The MMC of claim 10, wherein the first AC network has a nominal frequency of 50 Hz or 60 Hz.

13. The MMC of claim 10, wherein the second AC network has a nominal frequency of 25 Hz, 50/3 Hz or 16.70 Hz.

14. The MMC of claim 10, wherein the plurality of cells of each branch is less than 20 cells.

15. The MMC of claim 10, wherein each of the plurality of cells has a switching frequency of at most 150 Hz.

16. The MMC of claim 10, wherein the MMC has an operating voltage of less than 30 kV.

17. The MMC of claim 10, wherein the MMC has an operating power within the range of 10 to 60 MW.

18. The method of claim 2, wherein the first AC network has a nominal frequency of 50 Hz or 60 Hz.

19. The method of claim 2, wherein the second AC network has a nominal frequency of 25 Hz, 50/3 Hz or 16.70 Hz.

20. The method of claim 3, wherein the second AC network has a nominal frequency of 25 Hz, 50/3 Hz or 16.70 Hz.

* * * * *